United States Patent
Geurts et al.

(10) Patent No.: US 7,833,584 B2
(45) Date of Patent: Nov. 16, 2010

(54) AQUEOUS VINYL COATING COMPOSITIONS

(75) Inventors: John Geurts, Waalwijk (NL); Rajasingham Satgurunathan, Waalwijk (NL); Jan Bouman, Waalwijk (NL); Gerardus Cornelis Overbeek, Waalwijk (NL)

(73) Assignee: DSM IP Assets B.V., Heerlen (NL)

( * ) Notice: Subject to any disclaimer, the term of this patent is extended or adjusted under 35 U.S.C. 154(b) by 484 days.

(21) Appl. No.: 11/918,132

(22) PCT Filed: Mar. 31, 2006

(86) PCT No.: PCT/EP2006/003188

§ 371 (c)(1),
(2), (4) Date: Feb. 13, 2008

(87) PCT Pub. No.: WO2006/108570

PCT Pub. Date: Oct. 19, 2006

(65) Prior Publication Data

US 2009/0068367 A1 Mar. 12, 2009

(30) Foreign Application Priority Data

Apr. 13, 2005 (GB) ................. 0507421.6

(51) Int. Cl.
*B05D 3/02* (2006.01)

(52) U.S. Cl. .................. 427/385.5; 524/502
(58) Field of Classification Search .............. None
See application file for complete search history.

(56) References Cited

U.S. PATENT DOCUMENTS

| 4,132,688 | A | 1/1979 | Berenschot et al. |
| 4,624,973 | A | 11/1986 | Kuwajima et al. |
| 6,992,121 | B1 * | 1/2006 | Peters et al. ............. 523/206 |
| 7,049,352 | B2 * | 5/2006 | Gould et al. ............. 523/201 |
| 7,569,636 | B2 * | 8/2009 | Tennebroek et al. ....... 524/501 |

FOREIGN PATENT DOCUMENTS

WO  WO 95/09209  4/1995

OTHER PUBLICATIONS

International Search Report mailed Jun. 6, 2006 in PCT/EP2006/003188.
Written Opinion mailed Jun. 6, 2006 in PCT/EP2006/003188.

* cited by examiner

*Primary Examiner*—Erma Cameron
(74) *Attorney, Agent, or Firm*—Nixon & Vanderhye P.C.

(57) ABSTRACT

Aqueous coating composition comprising a blend of 20 to 60 wt % of a multistage vinyl polymer (A) comprising 5 to 40 wt % of at least one hard polymer stage (i) having a $Tg \geq 50°$ C. and 95 to 60 wt % of at least one soft polymer stage (ii) having a $Tg \leq -5°$ C.; and 80 to 40 wt % of a vinyl oligomer-polymer (B) comprising 15 to 50 wt % of at least one alkaline soluble oligomer (iii) and 85 to 50 wt % of at least one vinyl polymer (iv) having a Tg in the range of from $-20$ to $30°$ C.

19 Claims, No Drawings

US 7,833,584 B2

AQUEOUS VINYL COATING COMPOSITIONS

This application is the US national phase of international application PCT/EP2006/003188 filed 31 Mar. 2006 which designated the U.S. and claims benefit of GB 0507421.6, dated 13 Apr. 2005, the entire content of which is hereby incorporated by reference.

The present invention relates to an aqueous coating composition comprising a certain blend of a multistage vinyl polymer and vinyl oligomer-polymer.

Aqueous polymer compositions providing coatings having good hardness are known in the art. They can for example be achieved by employing "hard" (i.e. high Tg) polymer compositions. This however often requires excessive amounts of coalescing solvent to obtain film coatings at ambient temperature. Moreover such coatings are often unsatisfactory because the polymer film coating may possess little flexibility on substrates such as wood, which are not dimensionally stable.

A more sophisticated approach that is known, is to employ morphologically designed polymer systems in aqueous compositions, for example a blend of hard (i.e. high Tg) and soft (i.e. low Tg) polymers or a multistage combination of hard and soft polymers, i.e. polymers formed by a sequential polymerisation process.

WO 98/08882 describes a two stage emulsion polymer with a hard first phase (Tg of at least 70° C.) and a softer second phase (Tg between about 5° C. to 50° C.) where the second stage includes a functional monomer. The patent does not teach a low minimum film forming temperature (MFFT) with no or only a minor amount of added solvent.

U.S. Pat. No. 5,731,377 describes a no volatile organic compound (VOC) containing coating, comprising a blend of 20 to 60 wt % of at least one hard emulsion polymer with a Tg greater than about 20° C. and 80 to 40 wt % of at least one soft emulsion polymer with a Tg less than about 15° C. The patent does not teach a flexible resultant coating.

U.S. Pat. No. 4,916,171 describes a composition comprising a core-shell polymer having an alkali-insoluble emulsion polymer core and an alkali-soluble emulsion polymer shell attached or associated with said core. Paints derived from the composition contain solvents to provide the desired properties.

EP 816402 describes a surfactant free solution or dispersion of a (partly) dissolved acid-functional polymer (A) which is used in an emulsion polymerisation, in which polymer (B) is polymerised in the presence of said polymer (A).

WO 03/031526 describes a pigmented coating with a pigmented volume concentration (PVC) of 15 to 35% and an elasticity value of at least 30%, where the binder is a blend of a seeded multistage latex with a non-film forming latex and the use of solvents in the formulations.

U.S. Pat. No. 6,531,185 describes a hydrophobic thermoplastic film having no surface tack consisting of a soft polymer P1 (Tg lower than 20° C.) dispersed in 10 to 30% hard polymer P2 (Tg higher than 50° C.) in the form of nodules P1 in P2 (matrix polymer) and P1 is more hydrophobic than P2.

EP 1352924 describes an aqueous polymer blend comprising 2 to 30 wt % of hard (Tg greater than 25° C.) particles and 70 to 98 wt % of soft (Tg from −20 to 25° C.) particles to provide dirt pickup resistance.

We have now discovered certain aqueous compositions which achieve good hardness, good flexibility and have a low minimum film forming temperature even when pigmented.

According to the present invention there is provided an aqueous coating composition comprising a blend of 20 to 60 wt % of a multistage vinyl polymer (A) and 80 to 40 wt % of a vinyl oligomer-polymer (B) based on the total weight of (A) and (B);

wherein the multistage vinyl polymer (A) comprises:

5 to 40 wt % of at least one hard polymer stage (i) having a Tg≧50° C.; and 95 to 60 wt % of at least one soft polymer stage (ii) having a Tg≦5° C.;

based on the total weight of (i) and (ii); and wherein the vinyl oligomer-polymer (B) comprises:

15 to 50 wt % of at least one alkaline soluble oligomer (iii); and 85 to 50 wt % of at least one vinyl polymer (iv) having a Tg in the range of from −20° C. to 30° C.;

based on the total weight of (iii) and (iv).

By an aqueous coating composition is meant herein a dispersion or emulsion of the vinyl polymer (A) and vinyl oligomer-polymer (B) thereof in an aqueous carrier medium of which water is the principal component (at least 50% by weight, most usually at least 90% by weight of the carrier medium).

The term vinyl polymer as used herein includes one vinyl polymer as well as more than one vinyl polymer. The term vinyl oligomer-polymer as used herein includes one vinyl oligomer-polymer as well as more than one vinyl oligomer-polymer. The term oligomer as used herein includes one oligomer as well as more than one oligomer.

By a multistage vinyl polymer (A) herein is meant a polymer system that has been formed by a multistage emulsion polymerisation process in which two or more polymer stages are prepared by the sequential aqueous emulsion polymerisation of two or more distinct monomer mixtures. Thus in its simplest and preferred form a first polymer stage is preferably formed by emulsion polymerisation, which could for example be either soft or hard as defined in the invention and then a second polymer stage is preferably formed by emulsion polymerisation in the presence of the first polymer stage; the second polymer could be soft if the first polymer is hard, or could be hard if the first polymer is soft. More complex multistage polymer designs include ones with 2 or more soft polymer stages and/or 2 or more hard polymer stages, the polymerisations being carried out in any order.

The Tg of a polymer herein stands for the glass transition temperature and is well known to be the temperature at which a polymer changes from a glassy, brittle state to a rubbery state. Tg values of polymers may be calculated using the well-known Fox equation. Thus the Tg, in degrees Kelvin, of a copolymer having "n" copolymerised comonomers is given by the weight fractions W of each comonomer type and the Tg's of the homopolymers (in degrees Kelvin) derived from each comonomer according to the equation: $1/Tg = W_1/Tg_1 + W_2/Tg_2 + \ldots W_n/Tg_n$. The calculated Tg in degrees Kelvin may be readily converted to °C.

A polymer having a Tg of ≦−5° C. is defined herein as a "soft" polymer, while a polymer having a Tg of ≧50° C. is defined herein as a "hard" polymer.

Preferably the Tg of polymer stage (i) is in the range of from 50° C. to 120° C. preferably in the range of from 50° C. to 110° C. and most preferably in the range of from 70° C. to 110° C.

Preferably the Tg of polymer stage (ii) is in the range of from −40° C. to −5° C., more preferably in the range of from −35° C. to −10° C. and most preferably in the range of from −25° C. to −10° C.

Preferably the Tg of oligomer (iii) is ≧40° C., more preferably ≧70° C. and most preferably in the range of from 70 to 150° C.

Preferably the Tg of vinyl polymer (iv) is in the range of from −10° C. to 20° C. and more preferably has a Tg in the range of from −5 to 10° C.

The vinyl oligomer-polymer (B) of the invention is usually also made by an emulsion polymerisation process. The oligomer (iii) may be formed by any possible route known in the art including bulk, solution or emulsion polymerisation (in case of a solution polymerisation the solvent is preferably removed prior to use). Then preferably a vinyl polymer (iv) is formed by emulsion polymerisation in the presence of the oligomer. The vinyl polymer (iv) may consist of a multistage vinyl polymer.

The oligomer (iii) preferably has a weight average molecular weight (Mw) in the range of from 2,000 to 50,000 g/mol. When the oligomer (iii) is prepared by emulsion polymerisation it preferably has an Mw in the range of from 4,000 to 35,000 g/mol and more preferably 6,000 to 25,000 g/mol and most preferably 8,000 to 25,000 g/mol. Alternatively when the oligomer (iii) is prepared by solution polymerisation it preferably has an Mw in the range of from 2,000 to 15,000 g/mol, more preferably 2,500 to 15,000 g/mol and most preferably 2,500 to 10,000 g/mol.

The vinyl polymer (iv) preferably has an Mw≧50,000 g/mol and more preferably has a Mw in the range of from 120,000 to 6×10$^6$ g/mol and most preferably 200,000 to 800,000 g/mol. Molecular weights of oligomers and polymers may be determined by using gel permeation chromatography using a polymer, such as polystyrene, of a known molecular weight as a standard.

Preferably the ratio of vinyl polymer (A) to vinyl oligomer-polymer (B) is in the range of from 60:40 to 30:70 and more preferably 50:50 to 40:60.

Preferably the ratio of polymer stage (i) to polymer stage (ii) is in the range of from 15:85 to 35:65 and more preferably in the range of from 20:80 to 30:70.

Preferably the ratio of oligomer (iii) to vinyl polymer (iv) is in the range of from 15:85 to 35:65 and more preferably in the range of from 20:80 to 30:70.

Preferably vinyl polymer A comprises at least 80 wt % of polymer stage (i) and polymer stage (ii) and more preferably 100 wt %.

Preferably oligomer-polymer B comprises at least 80 wt % of oligomer (iii) and polymer stage (iv) and more preferably 100 wt %.

The average particle diameter or size herein is that as determined by light scattering using a Malvern Zeta sizer 3000 HSa. Preferably the average particle size of vinyl polymer (A) and vinyl oligomer-polymer (B) is in the range of from 50 and 250 nm. Preferably the particle size of vinyl polymer (A) is 0.7 to 2.5 and more preferably 0.9 to 1.5 times the particle size of vinyl oligomer-polymer (B).

The polymers and oligomers employed in the invention are vinyl polymers and vinyl oligomers. By a vinyl polymer herein is meant a homo or copolymer derived from the addition polymerisation (using a free radical process) of at least one olefinically unsaturated monomer which are also known as vinyl monomers.

Examples of vinyl monomers which may be used to form the hard and soft stages of the multistage vinyl polymer (A) and the oligomer and polymer of the vinyl oligomer-polymer (B) include 1,3-butadiene, isoprene, styrene, α-methyl styrene, divinyl benzene, acrylonitronitrile, methacrylonitrile, vinyl halides such as vinyl chloride, vinyl esters such as vinyl acetate, vinyl propionate, vinyl laurate and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of (meth)acrylic acid of formula $CH_2=CR^1COOR^2$ wherein $R^1$ is H or methyl and $R^2$ is optionally substituted alkyl or cycloalkyl of 1 to 20 carbon atoms (more preferably 1 to 8 carbon atoms) examples of which are methyl (meth)acrylate, ethyl (meth)acrylate, butyl (meth)acrylate (all isomers), isobutyl (meth)acrylate, 2-ethylhexyl (meth)acrylate, isopropyl (meth)acrylate, propyl (meth)acrylate (all isomers) and hydroxyalkyl (meth)acrylates such as hydroxyethyl(meth)acrylate, 2-hydroxypropyl (meth)acrylate and their modified analogues like Tone M-100. (Tone is a trademark of Union Carbide Corporation). Olefinically unsaturated monocarboxylic and/or dicarboxylic acids, such as (meth)acrylic acid, beta carboxy ethylacrylate, fumaric acid and itaconic acid, are other examples which can be used.

Particularly preferred are vinyl polymers made from a monomer system comprising at least 60 wt % of one or more vinyl monomers of the formula $CH_2=CR^1COOR^2$ defined above, styrene, α-methyl styrene and acrylonitrile. Such preferred vinyl polymers are defined herein as acrylic polymers. More preferably, the vinyl monomer system contains at least 70 wt % of such monomers and particularly at least 80 wt %. The other monomers in such acrylic polymers (if used) may include one or more of the other vinyl monomers mentioned above and/or may include ones different to such other monomers. Most preferred monomers include methyl methacrylate, n-butyl (meth)acrylate, styrene and 2-ethylhexyl acrylate.

The vinyl polymers may contain vinyl monomers, which provide an adhesion and/or crosslinking functionality to the resulting polymer coating. Examples of these include (meth) acrylic monomers having at least one free carbonyl, hydroxyl, epoxy, aceto acetoxy, or amino group; allyl methacrylate, tetraethylene glycol methacrylate and divinyl benzene. Adhesion promoting monomers include amino, urea, or N-heterocyclic groups. Such monomers, when used, are normally used in an amount of from 0 to 5 wt % and more usually from 0 to 2 wt % of the total weight of monomers used for polymerisation.

It will be appreciated that although the multistage vinyl polymer (A) and the oligomer (iii) and vinyl polymer (iv) of the vinyl oligomer-polymer (B) can be made from one or more of the above-discussed vinyl monomers, it will be necessary to select both the amounts and types of such monomers to provide the desired Tg characteristics.

Preferably vinyl polymer (A), stages (i) and (ii) together, comprises ≦6 wt %, more preferably 0.5 to 4.5 wt % and most preferred 1 to 2.2 wt % of vinyl monomers bearing ionic or potentially ionic water-dispersing groups. Preferably the vinyl monomers bearing ionic or potentially ionic water-dispersing groups are vinyl monomers bearing anionic or potentially anionic water-dispersing groups, more preferably vinyl monomers bearing carboxylic acid groups and most preferably (meth)acrylic acid.

In a preferred embodiment a hard polymer stage (i) may be derived from a vinyl monomer composition comprising 40 to 100 wt % (more preferably 60 to 90 wt %) of at least one monomer selected from methyl methacrylate, styrene, ethyl methacrylate and acrylonitrile; 0 to 60 wt % (more preferably 10 to 40 wt %) of at least one monomer selected from n-butyl acrylate, n-butyl methacrylate, ethyl acrylate and 2-ethylhexyl acrylate; and 0 to 6 wt % (preferably 0.5 to 4.5 wt %) of at least one monomer selected from acrylic acid, methacrylic acid and beta carboxyethyl acrylate.

In a preferred embodiment a soft polymer stage (ii) may be derived from a vinyl monomer composition comprising 40 to 100 wt % (preferably 50 to 80 wt %) of at least one monomer selected from n-butyl acrylate, n-butyl methacrylate, ethyl acrylate and 2-ethylhexyl acrylate; 0 to 60 wt % (preferably 20 to 50 wt %) of at least one monomer selected from methyl methacrylate, styrene, ethyl methacrylate and acrylonitrile; and 0 to 6 wt % (preferably 0.5 to 4.5 wt %) of at least one monomer selected from acrylic acid, methacrylic acid and beta carboxyethyl acrylate.

Preferably the acid value of oligomer (iii) is in the range of from 50 to 325 mg KOH/g, more preferably 100 to 325 mg KOH/g and most preferably 200 to 325 mg KOH/g.

In an embodiment of the invention oligomer (iii) has an acid value in the range from 150 to 280 mg KOH/g, more preferably 200 to 280 mg KOH/g and a molecular weight in the range of from 2,500 and 15,000 g/mol and may be derived by means of a solution or bulk polymerisation of a vinyl monomer composition preferably comprising 50 to 90 wt % of at least one monomer selected from styrene or α-methyl styrene; and 10 to 50 wt % of at least one monomer selected from acrylic acid and methacrylic acid.

In another embodiment of the invention oligomer (iii) has an acid value in the range from 50 to 100 mg KOH/g and a molecular weight in the range of from 8,000 to 25,000 g/mol and may be derived by means of an emulsion polymerisation of a vinyl monomer composition preferably comprising 50 to 90 wt % (preferably 60 to 85 wt %) of at least one monomer selected from methyl methacrylate, ethyl methacrylate, butyl methacrylate, ethyl acrylate, butyl acrylate, 2-ethyl hexyl acrylate or styrene; 10 to 50 wt % of at least one monomer selected from acrylic acid and methacrylic acid; and 0 to 10 wt % of at least one monomer selected from hydroxyethyl (meth)acrylate, 2-hydroxypropyl (meth)acrylate, ethoxylated/propoxylated (meth)acrylate), diacetone acrylamide and acetoacetoxy ethyl methacrylate.

Preferably vinyl polymer (iv) comprises ≦5 wt %, more preferably ≦2 wt % and most preferably 0 wt % of vinyl monomers bearing ionic or potentially ionic water-dispersing groups. Preferably the vinyl monomers bearing ionic or potentially ionic water-dispersing groups are vinyl monomers bearing anionic or potentially anionic water-dispersing groups, more preferably vinyl monomers bearing carboxylic acid groups and most preferably are (meth)acrylic acid.

In a preferred embodiment vinyl polymer (iv) may be derived from a vinyl monomer composition comprising 30 to 65 wt % (more preferably 40 to 60 wt %) of at least one monomer selected from methyl methacrylate, styrene, ethyl methacrylate and acrylonitrile; 35 to 70 wt % (more preferably 40 to 60 wt %) of at least one monomer selected from n-butyl acrylate, n-butyl methacrylate, ethyl acrylate and 2-ethylhexyl acrylate; and 0 to 4 wt % (preferably 0 to 1 wt %) of at least one monomer selected from acrylic acid, methacrylic acid and beta carboxyethyl acrylate.

Preferably the blend comprises 10 to 40 wt %, more preferably 12.5 to 30 wt % and most preferably 12.5 to 20 wt % of oligomer (iii) by weight of (i), (ii), (iii)+(iv).

In a further preferred embodiment of the invention there is provided an aqueous coating composition comprising a blend of 20 to 60 wt % of a multistage vinyl polymer (A) and 80 to 40 wt % of a vinyl oligomer-polymer (B) based on the total weight of (A) and (B);

wherein the multistage vinyl polymer (A) comprises:

5 to 40 wt % of at least one hard polymer stage (i) having a Tg≧50° C.; and 95 to 60 wt % of at least one soft polymer stage (ii) having a Tg≦−5° C.;

based on the total weight of (i) and (ii); and wherein the vinyl oligomer-polymer (B) comprises:

15 to 50 wt % of at least one alkaline soluble oligomer (iii); and 85 to 50 wt % of at least one vinyl polymer (iv) having a Tg in the range of from −20 to 30° C.;

based on the total weight of (iii) and (iv).

In a most preferred embodiment of the invention there is provided an aqueous coating composition comprising a blend of 40 to 60 wt % of a multistage vinyl polymer (A) and 60 to 40 wt % of a vinyl oligomer-polymer (B) based in the total weight of (A) and (B);

wherein the multistage vinyl polymer (A) comprises:

20 to 30 wt % of at least one hard polymer stage (i) having a Tg in the range of from 70 to 110° C.; and 80 to 70 wt % of at least one soft polymer stage (ii) having a Tg in the range of from −25 to −10° C.;

based on the total weight of (i) and (ii); and wherein the vinyl oligomer-polymer (B) comprises:

20 to 30 wt % of at least one alkaline soluble oligomer (iii) having an acid number in the range of from 200 to 280 mg KOH/g and a molecular weight in the range of from 2,500 to 15,000 g/mol; and 80 to 70 wt % of at least one vinyl polymer (iv) having a Tg in the range of from 0 to 20° C.;

based on the total weight of (iii) and (iv).

In another embodiment of the invention there is provided an aqueous coating composition comprising a blend of 40 to 60 wt % of a multistage vinyl polymer (A) and 60 to 40 wt % of a vinyl oligomer-polymer (B) based on the total weight of (A) and (B);

wherein the multistage vinyl polymer (A) comprises:

20 to 30 wt % of at least one hard polymer stage (i) having a Tg in the range of from 70 to 110° C.; and 80 to 70 wt % of at least one soft polymer stage (ii) having a Tg in the range of from −25 to −10° C.;

based on the total weight of (i) and (ii); and wherein the vinyl oligomer-polymer (B) comprises:

20 to 30 wt % of at least one alkaline soluble oligomer (iii) having an acid number in the range of from 50 to 100 mg KOH/g and a molecular weight in the range of from 8,000 to 25,000 g/mol; and 80 to 70 wt % of at least one vinyl polymer (iv) having a Tg in the range of from 0 to 20° C.; based on the total weight of (iii) and (iv).

The vinyl polymers (i), (ii) and (iv) used in the invention composition are normally made using free radical addition polymerisation in an aqueous emulsion polymerisation process to form an aqueous polymer emulsion. Such an aqueous emulsion polymerisation process is, in itself, extremely well known in the art and need not be described in great detail. Suffice to say that such a process involves dispersing the vinyl monomers in an aqueous medium and conducting polymerisation using a free-radical yielding initiator and (usually) appropriate heating (e.g. 30 to 120° C.) and agitation (stirring) being employed. The aqueous emulsion polymerisation can be effected using one or more conventional emulsifying agents, these being surfactants. Anionic and non-ionic surfactants and combinations of the two types are preferred. Chain transfer agents (e.g. mercaptanes or suitable cobalt chelate complexes) may be included if desired to control molecular weight.

Suitable free-radical-yielding initiators include inorganic peroxides such as K, Na or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite and iso-ascorbic acid. Metal compounds such as Fe.EDTA (EDTA is ethylene diamine tetracetic acid) may also be usefully employed as part of the redox initiator system. Azo functional initiators may also be used. Preferred azo initiators include azobis(isobutyronitrile) and 4,4'-azobis(4-cyanovaleric acid). The amount of initiator or initiator system used is conventional, e.g. within the range 0.05 to 4 wt % based on the total vinyl monomers used. Preferred initiators include ammonium persulphates, sodium persulphates, potassium persulphates, azobis(isobutyronitrile), 4,4'-azobis(4-cyanovaleric acid) and/or t-butyl hydroperoxide.

Suitable chain transfer agents include mercaptans such as n-dodecylmercaptan, n-octylmercaptan, t-dodecylmercaptan, mercaptoethanol, iso-octyl thioglycolate, $C_2$ to $C_8$ mercapto carboxylic acids and esters thereof such as 3-mercaptopropionic acid and 2-mercaptopropionic acid; and halogenated hydrocarbons such as carbon tetrabromide and bromotrichloromethane. Preferably $\leq 5$ wt %, more preferably $\leq 3$ wt % and most preferably no chain transfer agent based on the weight of vinyl monomers required is used.

The amount of surfactant used in the emulsion polymerisation to make a multistage polymer is preferably 0.25 to 5 wt % based on the total weight of monomers used for the soft and hard stage polymers of the multistage polymer, more preferably 0.5 to 3 wt % and particularly 1 to 2 wt %.

An emulsion polymerisation for making a vinyl polymer may be carried out using an "all-in-one" batch process (i.e. a process in which all the materials to be employed are present in the polymerisation medium at the start of polymerisation) or a semi-batch process in which one or more of the materials employed (usually at least one of the monomers) is wholly or partially fed to the polymerisation medium during the polymerisation. In-line mixing for two or more of the materials employed may also be used.

According to present invention there is also provided a process for preparing a multistage vinyl polymer (A) comprising steps:
  I) emulsion polymerising vinyl monomers to obtain hard polymer stage (i);
  II) emulsion polymerising vinyl monomers in the presence of hard polymer stage (i) to obtain soft polymer stage (ii);
  III) optionally polymerising vinyl monomers in the presence of hard polymer stage (i) and soft polymer stage (ii) to obtain a further polymer stage(s).

According to present invention there is also provided a further process for preparing a multistage vinyl polymer (A) comprising steps:
  I) emulsion polymerising vinyl monomers to obtain soft polymer stage (ii);
  II) emulsion polymerising vinyl monomers in the presence of soft polymer stage (ii) to obtain hard polymer stage (i);
  III) optionally polymerising vinyl monomers in the presence of hard polymer stage (i) and soft polymer stage (ii) to obtain a further polymer stage(s).

According to present invention a gradient polymerisation process may also be used to prepare vinyl polymer (A). In such a process typically the first monomer feed is introduced into a reactor and the first monomer feed varies continuously due to the addition of a different second monomer feed to the first monomer feed.

Alternatively both feeds may be added directly to the reactor but the rate of addition of the one of the feeds varies with respect to the other.

The additions of the feeds may be parallel or the start of the first feed may proceed the start of the second feed in order to obtain a two stage polymer with a defined first stage and a gradient second stage.

The oligomer (iii) may be prepared by a free-radical polymerisation for example, an emulsion polymerisation, suspension polymerisation or bulk polymerisation process. Bulk polymerisation of vinyl monomers is described in detail in EP 0,156,170, WO 82/02387 and U.S. Pat. No. 4,414,370. Alternatively the oligomer (iii) may be prepared by an emulsion polymerisation process as described above.

According to present invention there is also provided a process for preparing a vinyl oligomer-polymer (B) comprising steps:
  I) dissipating an alkaline soluble oligomer (iii) in water;
  II) raising the pH of the aqueous medium in order to neutralise the alkaline soluble oligomer (iii); and
  III) emulsion polymerising vinyl monomers in the presence of the oligomer (iii) to obtain vinyl polymer (iv).

According to present invention there is also provided a further process for preparing a vinyl oligomer-polymer (B) comprising steps:
  I) emulsion polymerising vinyl monomers to obtain oligomer (iii);
  II) increasing the pH of the oligomer (iii) emulsion obtained in step I in order to neutralise the alkaline soluble oligomer (iii); and
  III) emulsion polymerising vinyl monomers in the presence of the oligomer (iii) from step II to obtain vinyl polymer (iv).

The pH is raised to neutralise sufficient of any acidic groups (i.e. render them sufficiently ionised) by the addition of a base, such as an organic or inorganic base, examples of which include organic amines such as trialkylamines (e.g. triethylamine, tributylamine), morpholine and alkanolamines and inorganic bases such as ammonia, NaOH, KOH and LiOH. Alternatively, the aqueous medium may already be alkaline (or sufficiently alkaline) to effect sufficient neutralisation without the requirement for adding a base to raise pH, or the base may be partially or completely added at any moment during the dissipation process.

The required minimum pH of the aqueous carrier medium will depend to some extent on the nature of any acidic groups such as carboxylic acid groups and their environment in the oligomer (iii), but generally speaking the pH of the aqueous medium is preferably $\geq 6.8$, more usually $\geq 7.0$ and particularly ≧7.3. Typically the pH of the aqueous carrier medium is preferably in the range of from 7.5 to 8.5.

Preferably the dissipation of the oligomer (iii) in the aqueous carrier medium takes place at a temperature between 30 and 120° C., more preferably between 40 and 95° C. and most preferably between 50 and 90° C.

The flexibility of an unpigmented film derived from the aqueous composition of the invention is preferably >150%, more preferably >200% and most preferably >250%. Flexibility as described herein is defined by a test method which is described later.

The hardness of an unpigmented film obtained from the aqueous composition of the invention is preferably >30 s, more preferably >40 s and most preferably >50 s. Hardness as described herein is defined by a test method which is described later.

According to the present invention there is further provided a pigment-containing aqueous coating composition. Preferably the aqueous composition of the invention is blended with a particulate pigment in an amount to provide a pigment volume concentration (PVC) in a pigmented coating formed from the coating composition. The PVC of a pigmented coating derived from the invention aqueous composition is preferably ≧10%, more preferably in the range of from 15% to 35%, most preferably 15 to 30% and particularly 15 to 25%. The PVC is defined as the percentage by volume that the pigment occupies in dry film made from the aqueous composition.

Pigments which may be used in the present invention include, for example, titanium dioxide, iron oxide, chromium-based compounds and metal phthalocyanine compounds. They are finely divided inorganic or organic powders (usually of a particle size in the region of 0.1 to 10 μm and are obtained for example by grinding or milling) for achieving properties such as colour, opacity and hiding power. They are usually incorporated into a coating composition in the form of a dry powder or a uniform dispersion of the pigment in a suitable carrier medium. Titanium dioxide (a white pigment) is the most preferred pigment in the present invention. As will be understood by one skilled in the art, it is also possible to replace part of the titanium dioxide by an organic opacifier.

The flexibility of a film obtained from a pigmented composition of the invention with a PVC in the range of from 15 to 25%, is preferably >80%, more preferably >100% and most preferably >120%.

The hardness of a film obtained from such a pigmented composition is preferably >30 s, more preferably >40 s and most preferably >50 s.

Preferably the minimum film forming temperature (MFFT) of vinyl oligomer-polymer B is ≦30° C., more preferably ≦20° C. and most preferably ≦10° C. Preferably the minimum film forming temperature of the composition of the invention (unpigmented) is ≦20° C., more preferably ≦10° C. and most preferably ≦5° C.

It is possible to incorporate coalescing agents (for example VOCs) into the composition to optimise or fine tune the film forming properties, usually in an amount of 0 to 10 wt %, more particularly 0 to 5 wt %, based on the weight of solid polymeric material in the composition. It is, however, preferred not to include a coalescent agent in the composition.

The pigmented composition preferably comprises <1 wt % of volatile organic compounds (VOC), more preferably <0.5 wt % VOC and preferably <0.1 wt % VOC.

The pigmented composition may additionally comprise in the range of from 0 to 10%, preferably 0 to 6%, more preferably 0 to 1% and most preferably 0% of plasticiser (plasticisers are usually described as being non-evaporative, i.e. they remain in a resultant coating).

The composition of this invention may contain various other ingredients such as extenders (e.g. calcium carbonate and china clay), dispersants such as pigment dispersion aids, surfactants, wetting agents, thickeners, rheology modifiers, levelling agents, anti-cratering agents, biocides, antifoam agents, sedimentation inhibitors, UV absorbers, heat stabilisers and antioxidants.

In particular the composition of invention may be in the form of (i.e. formulated as) a paint for architectural or industrial uses.

The invention coating compositions may be applied to a wide variety of substrates such as e.g. wood, paper, plastics, fibre, metal, glass, ceramics, plaster, asphalt, board, leather and concrete. Wood and board are the most preferred substrates. Application to a substrate may be any conventional method including brushing, dipping, flow coating, spraying, roller coating and pad coating.

The composition once applied may be allowed to dry naturally at ambient temperature which ranges from 4 to 40° C. and more preferably from 7 to 28° C.

There is further provided according to the invention a substrate carrying a pigmented coating derived from an aqueous coating composition as defined above.

There is further provided according to the invention a method of coating a substrate which comprises applying an aqueous coating composition as defined above to a substrate and drying the composition to obtain a coating.

The present invention is now further illustrated but in no way limited by reference to the following examples. Unless otherwise specified all parts, percentages and ratios are on a weight basis. The prefix C before an example number denotes that it is comparative.

In the examples the following abbreviations or trade names are employed.

DAAM=diacetonacrylamide
n-BA=n-butyl acrylate
MMA=methyl methacrylate
AA=acrylic acid
MM=methacrylic acid
S=styrene
PVC=pigment volume concentration
Drewplus™ S4386=defoamer (ex Ashland)
Dehydran™ 1293G=defoamer (ex Cognis)
SLS=sodium lauryl sulphate [30 wt % in water] (surfactant, ex Cognis)
Disperbyk™ 190=dispersing agent (ex Byk Cera)
Kronos™ 2190=titanium dioxide pigment (ex Kronos)
Coapur™ 3025=thickener (ex Coatex)
AMPS=ammonium persulphate
Indurez SR30=styrene acrylic solid resin oligomer (ex Indulor) acid value 240 to 260 mg KOH/g, Mw 2,500 to 3,500 g/mol, measured Tg about 72° C.
Indurez SR10=styrene acrylic solid resin oligomer (ex Indulor) acid value 215 to 230 mg KOH/g, Mw 6,000 to 8,000 g/mol, measured Tg about 105° C.
Indurez SR20=styrene acrylic solid resin oligomer (ex Indulor) acid value 210 to 225 mg KOH/g, Mw 11,000 to 13,000 g/mol, measured Tg about 107° C.

Ammonia=ammonia as a 25% solution in water

Vinyl Polymer A

PA1

Initial charge: water (555 g), SLS (1.5 g).

Monomer feed 1: S (162 g), n-BA (31 g), MM (4 g), water (50 g), SLS (3 g).

Monomer feed 2: S (167 g), n-BA (414 g), MM (12 g), water (160 g), SLS (8 g).

Initiator feed 1: AMPS (3 g), water (71 g).

Initiator feed 2: AMPS (0.6 g), water (25 g).

The initial charge mixture was transferred to the reaction vessel, stirred under a nitrogen atmosphere and the temperature was raised to 80° C. The monomer feed 1 was prepared and transferred to the feed vessel.

At a reactor vessel temperature of 80° C., 10% of monomer feed 1 was added, followed by an addition of AMPS (1 g in 20 g of water). After 5 minutes monomer feed 1 and initiator feed 1 were started. Both feeds were fed over 35 minutes. After the feed the reactor vessel was kept at 85° C. for 45 minutes.

After 45 minutes monomer and initiator feed 2 were started, both were added over 70 minutes.

A post reaction was conducted using t-butyl hydroperoxide (1.3 g), i-ascorbic acid (0.9 g), water (20 g) and ferrous sulphate hepta hydrate (1 cm$^3$, 1%). The reaction mixture was neutralised to a pH 8 to 8.5. Neutralisation of all vinyl polymer (A) was carried out using ammonia. The solids content was adjusted with water to 45%. The resulting emulsion polymer (PA1) had a pH of 8.3 and a viscosity of 127 mPa·s. All viscosity measurements where made at 25° C., using spindle 1 at 160 rpm. The particle size of all vinyl polymer (A) were between 100 and 150 nm.

PA2

An aqueous two-stage emulsion polymer was made in a manner similar to PA1, with a monomer feed 1 and 2 as described below:

Monomer feed 1: S (30 g), n-BA (9 g), MM (0.8 g), water (10 g), SLS (1.8 g).

Monomer feed 2: S (312 g), n-BA (424 g), MM (15 g), water (190 g), SLS (34 g).

The resulting emulsion polymer (PA2) had a pH of 8.3, a solids content of 45.0% and a viscosity of 49 mPa·s.

PA3

An aqueous two-stage emulsion polymer was made in a manner similar to PA1, with a monomer feed 1 and 2 as described below:

Monomer feed 1: S (37 g), n-BA (2 g), MAA (0.8 g), water (10 g), SLS (1.8 g).

Monomer feed 2: S (312 g), n-BA (424 g), MM (15 g), water (190 g), SLS (34 g).

The resulting emulsion polymer (PA3) had a pH of 8.2, a solids content of 45.0% and a viscosity of 107 mPa·s.

PA4

An aqueous two-stage emulsion polymer was made in a manner similar to PA1, with a monomer feed 1 and 2 as described below:

Monomer feed 1: S (30 g), n-BA (9 g), MM (0.8 g), water (10 g), SLS (1.8 g).

Monomer feed 2: S (224 g), n-BA (512 g), MAA (15 g), water (190 g), SLS (34 g).

The resulting emulsion polymer (PA4) had a pH of 8.2, a solids content of 45.0% and a viscosity of 28 mPa·s.

PA5

An aqueous two-stage emulsion polymer was made in a manner similar to PA1 with a monomer feed 1 and 2 as described below:

Monomer feed 1: S (179 g), n-BA (54 g), MM (4.7 g), water (60 g), SLS (11 g).

Monomer feed 2: S (165 g), n-BA (377 g), MM (11 g), water (140 g), SLS (25 g).

The resulting emulsion polymer (PA5) had a pH of 8.3, a solids content of 44.8% and a viscosity of 67 mPa·s.

PA6

An aqueous two-stage emulsion polymer was made in a manner similar to example 1, with a monomer feed 1 and 2 as described below:

Monomer feed 1: S (221 g), n-BA (11 g), MM (4.7 g), water (60 g), SLS (11 g).

Monomer feed 2: S (165 g), n-BA (377 g), MM (11 g), water (140 g), SLS (25 g).

The resulting emulsion polymer (PA6) had a pH of 8.3, a solids content of 45.7% and a viscosity of 43 mPa·s.

PA7

An aqueous two-stage emulsion polymer was made in a manner similar to example 1, with a monomer feed 1 and 2 as described below:

Monomer feed 1: S (34 g), n-BA (5 g), MAA (0.8 g), water (10 g), SLS (1.8 g).

Monomer feed 2: S (243 g), n-BA (494 g), MM (15 g), water (191 g), SLS (34 g).

The resulting emulsion polymer (PA7) had a pH of 8.3, a solids content of 45.3% and a viscosity of 270 mPa·s.

Comparative CPA8 where Tg (ii)=5° C.

An aqueous two-stage emulsion polymer was made in a manner similar to PA1 with a monomer feed 1 and 2 as described below:

Monomer feed 1: S (221 g), n-BA (11 g), MAA (4.7 g), water (60 g), SLS (11 g).

Monomer feed 2: S (328 g), n-BA (322 g), MAA (11 g), water (140 g), SLS (25 g).

The resulting emulsion polymer (CPA8) had a pH of 8.2, a solids content of 45.9% and a viscosity of 43 mPa·s.

PA9

Initial charge: water (552 g), SLS 30% sol. in water (6 g).

Monomer feed 1: S (151 g), n-BA (23 g), MAA (3.6 g), water (45 g), SLS (8 g).

Monomer feed 2: S (172 g), n-BA (351 g), MM (11 g), water (135 g), SLS (24 g).

Monomer feed 3: S (46 g), n-BA (31 g), MM (1.6 g), water (20 g), SLS (3.6 g).

Initiator feed 1: AMPS (0.9 g), water (29 g).

Initiator feed 2: AMPS (2.7 g), water (86 g).

Initiator feed 3: AMPS (0.4 g), water (13 g).

The initial charge mixture was transferred to the reaction vessel, stirred under a nitrogen atmosphere and the temperature was raised to 80° C. The monomer feed 1 was prepared and transferred to the feed vessel.

At a reactor vessel temperature of 80° C., 10% of monomer feed 1 was added, followed by an addition of AMPS (0.5 g in 10 g of water). After 5 minutes monomer feed 1 and initiator feed 1 were started. Both feeds were fed over 35 minutes. After the feed the reactor vessel was kept at 85° C. for 45 minutes.

After 45 minutes monomer and initiator feed 2 were started, both were added over 65 minutes. After the feed the reactor vessel was kept at 85° C. for 10 minutes.

After 10 minutes monomer and initiator feed 3 were started, both were added over 10 minutes.

A post reaction was conducted using t-butyl hydroperoxide (1.3 g), i-ascorbic acid (0.9 g), water (20 g) and ferrous sulphate hepta hydrate (1 cm$^3$, 1%). The reaction mixture was neutralised to a pH 8 to 8.5. The solids content was adjusted with water to 45.4%. The resulting emulsion polymer (PA9) had a pH of 8.3 and a viscosity of 97 mPa·s.

Vinyl Oligomer-Polymer B

OPB10

Initial charge: water (796 g), Indurez SR-30 (240 g), ammonia (61 g).

Initiator feed: AMPS (4 g), water (90 g)

Monomer feed: MMA (361 g), n-BA (361 g)

The initial charge mixture containing the oligomer was transferred to the reaction vessel and stirred under nitrogen purge. The heating mantle was turned on and the mixture was heated to 80° C. until the alkaline soluble resin was completely dissipated and pH of the solution was about 8.

The monomer feed to prepare vinyl polymer (iv) was prepared and transferred to the feed vessel. After the initial charge had completely dissipated, a solution of AMPS (2 g in 5 g of water) was added to the reactor. After 5 minutes both the monomer and initiator feed were started. The monomer feed was added over 120 minutes and the initiator feed over 135 minutes at a temperature of 85° C. After the monomer feed was completed, the temperature was maintained for 30 minutes.

A post reaction was conducted to minimise the free monomer content by charging t-butyl hydroperoxide (0.9 g), i-ascorbic acid (0.7 g) and water (35 g) to the reactor. The pH was adjusted to 8 with ammonia. Solids were adjusted to 45% with water and a viscosity of 128 mPa·s. The particle sizes of all vinyl oligomer-polymer (B) were between 80 and 160 nm. The MFFT values of all vinyl oligomer-polymer (B) were below 30° C.

OPB11

This was made in a manner similar to OPB10, with a monomer feed as described below:

Monomer feed: MMA (314 g), n-BA (408 g).

The resulting oligomer-polymer (OPB11) has a pH of 7.8, a solids content of 45.0% and a viscosity of 490 mPa·s.

OPB12

This was made in a manner similar to OPB10, with an initial charge and monomer feed as described below:

Initial charge: water (717 g), Indurez SR-30 (130 g), ammonia (33 g).

Monomer feed: MMA (382 g), n-BA (355 g).

The resulting emulsion polymer (OPB12) had a pH of 7.8, a solids content of 45.1% and a viscosity of 62 mPa·s.

OPB13

This was made in a manner similar to OPB10, with an initial charge and monomer feed as described below:

Initial charge: water (717 g), Indurez SR-30 (130 g), ammonia (33 g).

Monomer feed: MMA (320 g), n-BA (416 g).

The resulting emulsion polymer (OPB13) had a pH of 7.8, a solids content of 45.3% and a viscosity of 82 mPa·s.

Comparative OPB14 where Tg (iv)=40° C.

This was made in a manner similar to OPB10, with an initial charge and monomer feed as described below:

Initial charge: water (717 g), Indurez SR-30 (130 g), ammonia (33 g)

Monomer feed: MMA (526 g), n-BA (210 g).

The resulting emulsion polymer (COPB14) had a pH of 7.9, a solids content of 45.3% and a viscosity of 49 mPa·s.

Blend of Vinyl Polymer (A) and Vinyl Oligomer-Polymer (B)

EXAMPLES 1 TO 7 AND COMPARATIVE EXAMPLE 8

Blends were prepared from each vinyl polymer PA1 to PA7 and comparative CPA8, with vinyl oligomer-polymer (B) OPB10.

100 g (45%) of each vinyl polymer (A) was physically blended with 100 g (45%) of vinyl oligomer-polymer (B) providing a 50:50 blend (solids on solids) of a clear binder.

Pigment Paste:

Water (9.6 parts), Dehydran 1293G (1.4 parts), Disperbyk 190 (2.4 parts) Kronos 2190 (76.6 parts).

Pigmented Formulation:

A paint composition was made from the blend of vinyl polymer (A) and vinyl oligomer-polymer (B) prepared above, with the following formulation: Pigment paste (27 parts), blend of polymer (A) and vinyl oligomer-polymer (B) (60.6 parts), water (8.0 parts), Coapur 3025 (2.6 parts) and Drewplus S4386 (1.6 parts).

The resultant pigmented formulation had a PVC of 20%, a solids content of 54% and a pH pf 8.4 to 8.6.

Film Formation (FF) at 4° C.

A 200 μm wet film of a pigmented formulation was applied on cardboard. This film was dried for 16 hours at 4° C. The film was assessed after 16 hours and a 5 was assigned when the film was crack free (very good), 4=good, 3=acceptable, 2=not acceptable, 1=very bad and a zero was assigned when the film was completely cracked, powdery and totally unacceptable.

Determination of Flexibility

A 400 μm wet film of either the clear binder or the pigmented formulation was applied on glass panel containing release paper. This film was allowed to dry for 4 hours at ambient temperature (7 to 28° C.) and then 16 hours at 50° C. The film was released from the release paper and cut into dumb bell shaped samples. Flexibility of a sample was measured using an Instron instrument at a draw-bench speed of 100 mm/min. The result was expressed as a percentage, i.e. if original length=x; extended length is y; and extension= (y−x); then flexibility=(y−x)/x*100%.

Surface Hardness

König Hardness of both the film of the clear binder and the pigmented formulation was determined following DIN53157 using Erichsen hardness measurement equipment. The values are given in seconds and the higher the value was the harder the coating was.

Table 1 below shows the results of examples 1 to 7 and comparative example 8, which illustrate the ranges of the Tg (i), Tg (ii) and ratio (i)/(ii). All polymers form a film at 4° C., have a hardness >30 s and a flexibility >80% except for comparative example 8 prepared with CPA8.

TABLE 1

| | | Vinyl Polymer (A) | | | Vinyl Oligomer Polymer (B) | | | Blend | | | Hardness | | Flexibility | |
|---|---|---|---|---|---|---|---|---|---|---|---|---|---|---|
| Ex. | | Tg(i) °C. | Tg(ii) °C. | Ratio (i)/(ii) | | Tg(iii) °C. | Tg(iv) °C. | Ratio (iii)/(iv) | Ratio (A)/(B) | FF p.[1] | u.p.[1] | p.[1] | u.p.[1] | p.[1] |
| 1 | PA1 | 70 | −17 | 25/75 | OPB10 | 72 | 4 | 25/75 | 50/50 | 5 | 50 | 56 | 310 | 120 |
| 2 | PA2 | 50 | −5 | 5/95 | OPB10 | 72 | 4 | 25/75 | 50/50 | 4 | 51 | 62 | 375 | 143 |
| 3 | PA3 | 90 | −5 | 5/95 | OPB10 | 72 | 4 | 25/75 | 50/50 | 5 | 59 | 67 | 293 | 121 |
| 4 | PA4 | 90 | −20 | 5/95 | OPB10 | 72 | 4 | 25/75 | 50/50 | 5 | 35 | 39 | 510 | 188 |
| 5 | PA5 | 50 | −20 | 30/70 | OPB10 | 72 | 4 | 25/75 | 50/50 | 3 | 53 | 63 | 209 | 81 |
| 6 | PA6 | 90 | −20 | 30/70 | OPB10 | 72 | 4 | 25/75 | 50/50 | 4 | 56 | 57 | 217 | 85 |
| 7 | PA7 | 70 | −17 | 5/95 | OPB10 | 72 | 4 | 25/75 | 50/50 | 4 | 40 | 43 | 480 | 192 |
| C8 | CPA8 | 90 | 5 | 30/70 | OPB10 | 72 | 4 | 25/75 | 50/50 | 1 | 80 | 87 | 106 | 8 | u.p.[1] = unpigmented p.[1] = pigmented

EXAMPLE 9

A blend was prepared using PA9 with OPB10. The blend was prepared and tested in a similar way as described above. The ratio between vinyl polymer A and B was 50/50.

PA9 contains 3 phases with a theoretical Tg of respectively 70° C./−17° C./20° C. in a ratio 22.5/67.5/10. The results of the tests were respectively:

Film formation 4° C. (pigmented formulation): 4

Hardness unpigmented (s): 62

Hardness pigmented (s): 71

Flexibility unpigmented (%): 361

Flexibility pigmented (%): 108

EXAMPLES 10 TO 12 AND COMPARATIVE EXAMPLE 13

A blend was prepared using PA1 with oligomer-polymer (B) OPB11, OPB12, OPB13 and COPB14. The blends were prepared and tested in a similar way as described above.

The results of examples 10 to 12 and comparative example 13 are presented in Table 2 below. All polymers form a film at 4° C., have a hardness >30 s and a flexibility >80% except comparative example 13 prepared with COPB14.

TABLE 2

| | | Vinyl Polymer (A) | | | Vinyl Oligomer Polymer (B) | | | Blend | | | Hardness | | Flexibility | |
|---|---|---|---|---|---|---|---|---|---|---|---|---|---|---|
| Ex. | | Tg(i) °C. | Tg(ii) °C. | Ratio (i)/(ii) | | Tg(iii) °C. | Tg(iv) °C. | Ratio (iii)/(iv) | Ratio (A)/(B) | FF p.[1] | u.p.[1] | p.[1] | u.p.[1] | p.[1] |
| 1 | PA1 | 70 | −17 | 25/75 | OPB10 | 72 | 4 | 25/75 | 50/50 | 5 | 50 | 56 | 310 | 120 |
| 10 | PA1 | 70 | −17 | 25/75 | OPB11 | 72 | −5 | 25/75 | 50/50 | 5 | 35 | 39 | 561 | 228 |
| 11 | PA1 | 70 | −17 | 25/75 | OPB12 | 72 | 7 | 15/85 | 50/50 | 5 | 45 | 48 | 411 | 215 |
| 12 | PA1 | 70 | −17 | 25/75 | OPB13 | 72 | −5 | 15/85 | 50/50 | 5 | 30 | 32 | 672 | 280 |
| C13 | PA1 | 70 | −17 | 25/75 | COPB14 | 72 | 40 | 15/85 | 50/50 | 0 | 82 | — | — | — | u.p.[1] = unpigmented p.[1] = pigmented — = not measurable

EXAMPLES 14, 15, COMPARATIVE EXAMPLES 16 AND 17

To exemplify the effect of the ratio vinyl polymer (A) to oligomer-polymer (B) a series of blends was prepared with PA1 and OPB10. The blends were prepared and tested in a similar way as described above. The results are presented in Table 3 below.

A post reaction was conducted to minimise the free monomer content by charging t-butyl hydroperoxide (0.9 g), i-ascorbic acid (0.7 g) and water (35 g) to the reactor. The pH was adjusted to 8 with ammonia. Solids were adjusted to 30% with water.

The resulting oligomer Q solution had a pH of 8, a solids content of 30.0%, a viscosity of 600 mPa·s, an acid number of 65, a Tg of 44° C. and a Mw of 14,000 g/mol.

TABLE 3

| | | Vinyl Polymer (A) | | | | Vinyl Oligomer Polymer (B) | | | Blend | | | | | |
|---|---|---|---|---|---|---|---|---|---|---|---|---|---|---|
| | | Tg(i) | Tg(ii) | Ratio | | Tg(iii) | Tg(iv) | Ratio | Ratio | FF | Hardness | | Flexibility | |
| Ex. | | °C. | °C. | (i)/(ii) | | °C. | °C. | (iii)/(iv) | (A)/(B) | p.[1] | u.p.[1] | p.[1] | u.p.[1] | p.[1] |
| 14 | PA1 | 70 | −17 | 25/75 | OPB10 | 72 | 4 | 25/75 | 60/40 | 5 | 50 | 56 | 310 | 120 |
| 1 | PA1 | 70 | −17 | 25/75 | OPB10 | 72 | 4 | 25/75 | 50/50 | 5 | 48 | 60 | 365 | 143 |
| 15 | PA1 | 70 | −17 | 25/75 | OPB10 | 72 | 4 | 25/75 | 70/30 | 5 | 32 | 35 | 520 | 305 |
| C16 | PA1 | 70 | −17 | 25/75 | OPB10 | 72 | 4 | 25/75 | 10/90 | 1 | 81 | 85 | 5 | — |
| C17 | PA1 | 70 | −17 | 25/75 | OPB10 | 72 | 4 | 25/75 | 90/10 | 5 | 14 | 15 | >850 | 650 | u.p.[1] = unpigmented p.[1] = pigmented — = not measurable

Vinyl Oligomer-Polymer (B)

OPB15

This was made in a manner similar OPB10, with an initial charge as described below:

Initial charge: water (796 g), Indurez SR-10 (240 g), ammonia (61 g).

The resulting oligomer-polymer (OPB15) had a pH of 8, a solids content of 45.0% and a viscosity of 98 mPa·s.

OPB16

This was made in a manner similar OPB10, with an initial charge as described below:

Initial charge: water (796 g), Indurez SR-20 (240 g), ammonia (61 g).

The resulting oligomer-polymer (OPB16) had a pH of 7.8, a solids content of 45.0% and a viscosity of 176 mPa·s.

Oligomer (iii)=Oligomer Q

Initial charge: water (921 g), SLS (0.4 g), AMPS (0.5 g)

Initiator feed: AMPS (1.2 g), water (115 g)

Monomer feed: water (213 g), SLS (8 g) MAA (54 g), n-BA (156 g), MMA (301 g), DAAM (33 g), 3-mercaptopropionic acid (15.6 g)

The initial charge mixture was transferred to the reaction vessel and stirred under nitrogen purge. The heating mantle was turned on and the mixture was heated to 85° C.

The monomer feed was prepared and transferred to the feed vessel. When the reaction vessel reaches 85° C. both the monomer and initiator feed were started. The monomer and initiator feed were added over 90 minutes at a temperature of 85° C. After the monomer feed was completed, the temperature was maintained for 30 minutes.

Vinyl Oligomer-Polymer (B)

OPB17

Initial charge: water (500 g), oligomer solution Q (181 g), iron sulphate (0.02 g), t-butyl hydroperoxide 70% (4.5 g)

Initiator feed 1: sodium metabisulphite (1.9 g), water (21.6 g)

Initiator feed 2: sodium metabisulphite (1.3 g), water (14.4 g)

Monomer feed: MMA (319 g), n-BA (319 g)

The initial charge mixture was transferred to the reaction vessel and stirred under nitrogen purge.

The monomer feed was prepared and transferred to the feed vessel. At 20° C., 60% of the monomer feed was transferred to the reaction vessel. The initiator feed was added over 30 minutes. The temperature increased to 90° C. during the feed. Temperature was maintained at 90° C. for 15 minutes.

A second amount of oligomer solution Q (527 g) was added to the reaction mixture and the remaining 40% of the monomer feed was added to the reaction vessel. After 5 minutes initiator feed 2 was started and added over 15 minutes. Temperature increased from approximately 60° C. to 85° C. The reactor was maintained at 85° C. for 45 minutes and then cooled to 60° C.

A post reaction was conducted to minimise the free monomer content by adding sodium metabisulphite (0.9 g) and water (12.3 g) to the reactor over a period of 45 minutes at 60° C. The pH was adjusted to 8 with ammonia. Solids were adjusted to 45% with water.

EXAMPLES 18 TO 20

A blend was prepared using PA1 with vinyl oligomer-polymer (B) OPB15, OPB16 and OPB17. The blends were prepared and tested in a similar way as described above. The blend ratio was 50/50.

The results of examples 18 to 20 are shown below in Table 4. All polymers formed a film at 4° C., had a hardness >30 s and a flexibility >80%.

TABLE 4

| | | Vinyl Polymer (A) | | | Vinyl Oligomer Polymer (B) | | | | Blend | | Hardness | | Flexibility | |
|---|---|---|---|---|---|---|---|---|---|---|---|---|---|---|
| | | Tg(i) | Tg(ii) | Ratio | | Tg(iii) | Tg(iv) | Ratio | Ratio | FF | | | | |
| Ex. | | °C. | °C. | (i)/(ii) | | °C. | °C. | (iii)/(iv) | (A)/(B) | p.[1] | u.p.[1] | p.[1] | u.p.[1] | p.[1] |
| 1 | PA1 | 70 | −17 | 25/75 | OPB10 | 72 | 4 | 25/75 | 50/50 | 5 | 50 | 56 | 310 | 120 |
| 18 | PA1 | 70 | −17 | 25/75 | OPB15 | 72 | 4 | 25/75 | 50/50 | 5 | 52 | 52 | 300 | 115 |
| 19 | PA1 | 70 | −17 | 25/75 | OPB16 | 72 | 4 | 25/75 | 50/50 | 5 | 56 | 60 | 320 | 120 |
| 20 | PA1 | 70 | −17 | 25/75 | OPB17 | 44 | 4 | 25/75 | 50/50 | 3 | 35 | 32 | 296 | 118 | u.p.[1] = unpigmented  p.[1] = pigmented

The invention claimed is:

1. An aqueous coating composition comprising a blend of 20 to 60 wt % of a multistage vinyl polymer (A) and 80 to 40 wt % of a vinyl oligomer-polymer (B) based on the total weight of (A) and (B);
   wherein the multistage vinyl polymer (A) comprises:
   5 to 40 wt % of at least one hard polymer stage (i) having a Tg≧50° C.; and
   95 to 60 wt % of at least one soft polymer stage (ii) having a Tg≦−5° C.;
   based on the total weight of (i) and (ii); and
   wherein the vinyl oligomer-polymer (B) comprises:
   15 to 50 wt % of at least one alkaline soluble oligomer (iii); and
   85 to 50 wt % of at least one vinyl polymer (iv) having a Tg in the range of from −20 to 30° C.;
   based on the total weight of (iii) and (iv).

2. A composition according to claim 1 wherein the ratio of polymer stage (i) to polymer stage (ii) is in the range of from 15:85 to 35:65.

3. A composition according to claim 1 wherein vinyl polymer (A) comprises at least 80 wt % of polymer stage (i) and polymer stage (ii).

4. A composition according to claim 1 wherein vinyl oligomer-polymer (B) comprises at least 80 wt % of oligomer (iii) and vinyl polymer stage (iv).

5. Composition according to claim 1 wherein the ratio of oligomer (iii) to vinyl polymer (iv) is in the range of from 15:85 to 35:65.

6. Composition according to claim 1 wherein the ratio of vinyl polymer (A) to vinyl oligomer-polymer (B) is in the range of from 60:40 to 30:70.

7. A composition according to claim 1 wherein the weight average molecular weight of oligomer (iii) is in the range of from 2,000 to 50,000 g/mol.

8. A composition according to claim 1 comprising a blend of 40 to 60 wt % of a multistage vinyl polymer (A) and 60 to 40 wt % of a vinyl oligomer-polymer (B) based in the total weight of (A) and (B);
   wherein the multistage vinyl polymer (A) comprises:
   20 to 30 wt % of at least one hard polymer stage (i) having a Tg in the range of from 70 to 110° C.; and
   80 to 70 wt % of at least one soft polymer stage (ii) having a Tg in the range of from −25 to −10° C.;
   based on the total weight of (i) and (ii); and
   wherein the vinyl oligomer-polymer (B) comprises:
   20 to 30 wt % of at least one alkaline soluble oligomer (iii) having an acid number in the range of from 200 to 280 mg KOH/g and a molecular weight in the range of from 2,500 to 15,000 g/mol; and
   80 to 70 wt % of at least one vinyl polymer (iv) having a Tg in the range of from 0 to 20° C.;
   based on the total weight of (iii) and (iv).

9. A composition according to claim 1 comprising a blend of 40 to 60 wt % of a multistage vinyl polymer (A) and 60 to 40 wt % of a vinyl oligomer-polymer (B) based on the total weight of (A) and (B);
   wherein the multistage vinyl polymer (A) comprises:
   20 to 30 wt % of at least one hard polymer stage (i) having a Tg in the range of from 70 to 110° C.; and
   80 to 70 wt % of at least one soft polymer stage (ii) having a Tg in the range of from −25 to −10° C.;
   based on the total weight of (i) and (ii); and
   wherein the vinyl oligomer-polymer (B) comprises:
   20 to 30 wt % of at least one alkaline soluble oligomer (iii) having an acid number in the range of from 50 to 100 mg KOH/g and a molecular weight in the range of from 8,000 to 25,000 g/mol; and
   80 to 70 wt % of at least one vinyl polymer (iv) having a Tg in the range of from 0 to 20° C.;
   based on the total weight of (iii) and (iv).

10. Composition according to claim 1 wherein vinyl polymer (A) comprises ≦6 wt % of vinyl monomers bearing ionic or potentially ionic water-dispersing groups.

11. A composition according to claim 1 wherein vinyl polymer (iv) comprises ≦5 wt % of vinyl monomers bearing ionic or potentially ionic water-dispersing groups.

12. A composition according to claim 1 wherein the minimum film forming temperature of vinyl oligomer-polymer B is ≦30° C.

13. A composition according to claim 1 wherein the hardness of a film obtained from the aqueous composition is >30 s.

14. A composition according to claim 1 additionally comprising a pigment to provide a pigment volume concentration (PVC) which is ≧10%.

15. A composition according to claim 14 wherein the pigmented composition comprises <1 wt % of volatile organic compounds.

16. A composition according to claim 14 wherein the hardness of a film obtained from the pigmented composition is >30 s.

17. A composition according to claim 14 wherein the flexibility of a film obtained from a pigmented composition with a PVC in the range of from 15 to 25% is >80%.

18. A substrate carrying a coating derived from an aqueous coating composition according to claim 1.

19. A method of coating a substrate, which comprises applying an aqueous coating composition according to claim 1 to a substrate and drying of the composition to obtain a coating.

* * * * *